(12) United States Patent
Higa

(10) Patent No.: US 12,712,462 B2
(45) Date of Patent: Aug. 18, 2026

(54) BIDIRECTIONAL ISOLATED DC-DC CONVERTER HAVING REDUCED VOLTAGE INCREASE FOR LEAKAGE INDUCTANCE OF TRANSFORMER

(71) Applicant: MEIDENSHA CORPORATION, Tokyo (JP)

(72) Inventor: Hayato Higa, Mishima (JP)

(73) Assignee: MEIDENSHA CORPORATION, Tokyo (JP)

( * ) Notice: Subject to any disclaimer, the term of this patent is extended or adjusted under 35 U.S.C. 154(b) by 0 days.

(21) Appl. No.: 19/136,806

(22) PCT Filed: Dec. 6, 2023

(86) PCT No.: PCT/JP2023/043654
§ 371 (c)(1),
(2) Date: Jun. 6, 2025

(87) PCT Pub. No.: WO2024/122580
PCT Pub. Date: Jun. 13, 2024

(65) Prior Publication Data

US 2026/0012100 A1 Jan. 8, 2026

(30) Foreign Application Priority Data

Dec. 7, 2022 (JP) ................................. 2022-195306

(51) Int. Cl.
*H02M 3/335* (2006.01)
*H02M 1/00* (2007.01)
*H02M 1/32* (2007.01)

(52) U.S. Cl.
CPC ..... *H02M 3/33584* (2013.01); *H02M 1/0058* (2021.05); *H02M 1/325* (2021.05); *H02M 3/33573* (2021.05)

(58) Field of Classification Search
CPC ......... H02M 3/33573; H02M 3/33584; H02M 3/01; H02M 1/325; H02M 1/0058
See application file for complete search history.

(56) References Cited

U.S. PATENT DOCUMENTS

2016/0181925 A1* 6/2016 Chiang ............ H02M 3/33584 363/17
2016/0233778 A1 8/2016 Sanada et al.
(Continued)

FOREIGN PATENT DOCUMENTS

CN 1585253 A * 2/2005
CN 113241952 A 8/2021
(Continued)

OTHER PUBLICATIONS

Weng et al., "Fault Tolerance Scheme for a DC Solid State Transformer," 2020 IEEE 9th International Power Electronics and Motion Control Conference (IPEMC2020—ECCE Asia), 2020, pp. 252-259.

(Continued)

*Primary Examiner* — Sisay G Tiku
(74) *Attorney, Agent, or Firm* — Foley & Lardner LLP

(57) ABSTRACT

A bidirectional isolated DC-DC converter includes a primary-side inverter; a first DC cut capacitor connected to the AC side of the primary-side inverter; a secondary-side inverter; a second DC cut capacitor connected to the AC side of the secondary-side inverter; a transformer having a primary winding connected to the AC side of the primary-side inverter, and a secondary winding connected to the AC side of the secondary-side inverter; and a control unit that controls switching devices of the primary-side inverter and the secondary-side inverter. The control unit determines an operation of the primary-side inverter and an operation of the secondary-side inverter so as to reduce an increase in
(Continued)

voltage to be applied to leakage inductances of the transformer, in accordance with failure states of the switching devices.

7 Claims, 5 Drawing Sheets

(56) References Cited

U.S. PATENT DOCUMENTS

| | | | | |
|---|---|---|---|---|
| 2020/0274457 | A1* | 8/2020 | Kajiyama | H02M 3/335 |
| 2020/0313443 | A1* | 10/2020 | ElMenshawy | H02M 3/33584 |
| 2020/0324665 | A1 | 10/2020 | Mackenzie et al. | |
| 2022/0115957 | A1* | 4/2022 | Smith | H02M 3/33573 |
| 2022/0385176 | A1 | 12/2022 | Drofenik et al. | |
| 2022/0416672 | A1 | 12/2022 | Zhuang et al. | |

FOREIGN PATENT DOCUMENTS

| | | | | |
|---|---|---|---|---|
| CN | 119030292 | A * | 11/2024 | H02M 3/28 |
| WO | WO-2015/056503 | A1 | 4/2015 | |

OTHER PUBLICATIONS

Costa et al., "A Fault-Tolerant Series-Resonant DC-DC Converter," in IEEE Transactions on Power Electronics, vol. 32, No. 2, pp. 900-905, Feb. 2017.

Pei et al., "Open-Circuit Fault Diagnosis and Fault-Tolerant Strategies for Full-Bridge DC-DC Converters," in IEEE Transactions on Power Electronics, vol. 27, No. 5, pp. 2550-2565, May 2012.

Qin et al., "A voltage doubler circuit to extend the soft-switching range of dual active bridge converters," 2017 IEEE Applied Power Electronics Conference and Exposition (APEC), 2017, pp. 300-306.

* cited by examiner (a) INV1: FB OPERATION, INV2: FB OPERATION (b) INV1: FB OPERATION, INV2: HB OPERATION (a) OPERATIONAL WAVEFORMS BEFORE AND AFTER OPERATION SWITCHING (b) ENLARGED WAVEFORMS UPON OPERATION SWITCHING (a) OPERATIONAL WAVEFORMS BEFORE AND AFTER OPERATION SWITCHING (b) ENLARGED WAVEFORMS UPON OPERATION SWITCHING

BIDIRECTIONAL ISOLATED DC-DC CONVERTER HAVING REDUCED VOLTAGE INCREASE FOR LEAKAGE INDUCTANCE OF TRANSFORMER

TECHNICAL FIELD

The present invention relates to improvement of a bidirectional isolated DC-DC converter in efficiency of fault-tolerant operation.

BACKGROUND ART

Converters connected to a power system are required to perform fault-tolerant operation so as not to affect other devices linked to the power system, even in case of a power system disturbance or an internal fault. Non-patent Documents 1 to 3 disclose prior arts of tolerant operation.

Non-patent Document 1 verifies fault-tolerant operation upon a short-circuit fault or an open-circuit fault in a semiconductor device, in a circuit system shown in FIG. 1 and circuit operation shown in FIG. 2.

The following describes operational waveforms in a Dual Active Bridge (hereinafter referred to as DAB) operation, with reference to FIG. 2. In FIG. 2 (*a*), a primary-side inverter INV1 is in full-bridge operation (hereinafter referred to as FB operation), and also a secondary-side inverter INV2 is in FB operation.

The primary-side inverter INV1 alternates between a state of S1, S4: ON and S2, S3: OFF and a state of S1, S4: OFF and S2, S3: ON. The secondary-side inverter INV2 alternates between a state of S5, S8: ON and S6, S7: OFF and a state of S5, S8: OFF and S6, S7: ON. The drawing shows how an output voltage Vpr of the primary-side inverter INV1 and an output voltage Vse and an AC current ipr of the secondary-side inverter INV2 behave.

In FIG. 2 (*b*), the primary-side inverter INV1 is in full-bridge operation, and the secondary-side inverter INV2 is in half-bridge operation (hereinafter referred to as HB operation).

The primary-side inverter INV1 alternates between a state of S1, S4: ON and S2, S3: OFF and a state of S1, S4: OFF and S2, S3: ON. The secondary-side inverter INV2 alternates between a state of S5, S8: ON and S6, S7: OFF and a state of S5, S7: OFF and S6, S8: ON. The drawing shows how the output voltage Vpr of the primary-side inverter INV1 and the output voltage Vse and the AC current ipr of the secondary-side inverter INV2 behave.

The FB operation alternates between two states: i.e., a state in which a first path conducts current while a second path does not conduct current, and a state in which the first path does not conduct current while the second path conducts current. In the HB operation, a first path is always in a state of not conducting current, while a second path alternates between a state of conducting current and a state of not conducting current.

Reference numeral Vin represents a primary-side DC voltage. Reference numeral Vout represents a secondary-side DC voltage.

As shown in FIG. 2 (*b*), the HB operation in which a normal component is always OFF in case of a short-circuit fault and always ON in case of an open-circuit fault allows the system to continue operating without propagating the fault to a power system even in the event of an internal fault.

Non-patent Documents 2 and 3 disclose achieving high-efficiency and fault-tolerant operation by operating a system with a switching frequency around a resonance frequency, and switching a transformer and a capacitor with a switch in case of a fault in a semiconductor device.

On the other hand, Non-patent Document 4 and Patent Document 1 disclose prior arts of DAB.

Non-patent Document 4 discloses operating a system as a DAB and maintaining an upper or lower arm of one leg always ON in order to perform HB operation, and thereby improving efficiency with respect to fluctuation in voltage.

Patent Document 1 discloses applying a pulse width control to a DAB method and thereby improving efficiency upon fluctuation in input/output DC voltage.

However, Non-patent Document 1 in case of falling into HB operation due to a fault would change in magnitude relationship of transformer voltage, and thereby deteriorate in efficiency due to failure of soft switching or increase of transformer current.

Non-patent Documents 2 and 3 need an additional component although achieving high-efficiency and fault-tolerant operation.

Non-patent Document 4 when applied as fault-tolerant operation upon a component fault would undergo a problem of a large current that occurs transiently.

Patent Document 1 does not include verification of fault-tolerant operation upon a component fault.

In view of the foregoing, it is desirable to provide a bidirectional isolated DC-DC converter structured to achieve fault-tolerant operation with high efficiency and without additional components.

PRIOR ART DOCUMENT(S)

Patent Document(s)

Patent Document 1: WO 2015/056503 A1

Non-patent Document(s)

Non-patent Document 1: Haoyuan Weng, Jinghang Li and Dehong Xu, "Fault Tolerance Scheme for a DC Solid State Transformer,"2020 IEEE 9th International Power Electronics and Motion Control Conference (IPEMC2020-ECCE Asia), 2020, pp. 252-259.

Non-patent Document 2: Levy Costa, Giampaolo Buticchi and Marco Liserre, "A Fault-Tolerant Series-Resonant DC-DC Converter," in IEEE Transactions on Power Electronics, vol.32, no. 2, pp. 900-905, Feb. 2017.

Non-patent Document 3: Xuejun Pei, Songsong Nie, Yu Chen and Yong Kang, "Open-Circuit Fault Diagnosis and Fault-Tolerant Strategies for Full-Bridge DC-DC Converters," in IEEE Transactions on Power Electronics, vol. 27, no. 5, pp. 2550-2565 May. 2012.

Non-patent Document 4: Zian Qin, Yanfeng Shen, Huai Wang and Frede Blaabjerg, "A voltage doubler circuit to extend the soft-switching range of dual active bridge converters,"2017 IEEE Applied Power Electronics Conference and Exposition (APEC), 2017, pp. 300-306.

SUMMARY OF THE INVENTION

The present invention has been devised in view of the foregoing conventional problems. According to one aspect of the present invention, a bidirectional isolated DC-DC converter includes: a primary-side inverter; a first DC cut capacitor connected to an AC side of the primary-side inverter; a secondary-side inverter; a second DC cut capacitor connected to an AC side of the secondary-side inverter; a transformer including a primary winding connected to the AC side of the primary-side inverter and a secondary winging connected to the AC side of the secondary-side inverter; and a controller configured to control switching devices of the primary-side inverter and the secondary-side inverter. The controller is configured to decide operation of the primary-side inverter and operation of the secondary-side inverter depending on a fault state of the switching devices of the primary-side inverter and the secondary-side inverter, so as to reduce increase in voltage applied to a leakage inductance of the transformer.

According to another aspect, the controller includes: a limiter configured to limit a phase difference command value to a value equal to or greater than a lower limit and equal to or less than an upper limit, and output the phase difference command value; a carrier generation section configured to output a carrier signal; a fault operation decision section configured to decide operation of a faulty inverter and operation of a normal inverter depending on a short-circuit fault signal or an open-circuit fault signal, so as to reduce a difference between the primary-side inverter and the secondary-side inverter in output voltage; and a gate signal generation section configured to generate gate signals for the switching devices, based on: the carrier signal and the phase difference command value outputted from the limiter, in case that both of the primary-side inverter and the secondary-side inverter are normal; and the carrier signal, the phase difference command value outputted from the limiter, and the operation of a faulty inverter and the operation of a normal inverter decided by the fault operation decision section, in case that at least one of the primary-side inverter and the secondary-side inverter is faulty.

According to still another aspect, the controller includes a normal operation decision section configured to output an output A and an output B based on the phase difference command value and a ratio of a primary-side DC voltage to a secondary-side DC voltage, wherein: the output A is a phase difference in output voltage between the primary-side inverter and the secondary-side inverter which achieves soft switching under a voltage condition between the primary-side DC voltage and the secondary-side DC voltage; and the output B is selection of full-bridge operation or half-bridge operation for the primary-side inverter and the secondary-side inverter. The gate signal generation section is configured to generate the gate signals based on a basis X and a basis Y in case that both of the primary-side inverter and the secondary-side inverter are normal, wherein: the basis X is comparison of the carrier signal with the phase difference that is closest to the phase difference command value among the phase differences satisfying the voltage condition; and the basis Y is the selection of full-bridge operation or half-bridge operation for the primary-side inverter and the secondary-side inverter which is outputted from the normal operation decision section.

According to still another aspect, the controller includes a gain adjustment section configured to multiply the phase difference command value by a gain based on the selection of full-bridge operation or half-bridge operation for the primary-side inverter and the secondary-side inverter, and output the phase difference command value after the gain multiplication to the limiter.

According to still another aspect, the switching devices of the primary-side inverter include first and second switching devices connected between a positive terminal and a negative terminal of a primary-side DC power supply and third and fourth switching devices connected between the positive terminal and the negative terminal of the primary-side DC power supply. The switching devices of the secondary-side inverter include fifth and sixth switching devices connected between a positive terminal and a negative terminal of a secondary-side DC power supply and seventh and eighth switching devices connected between the positive terminal and the negative terminal of the secondary-side DC power supply. The primary-side inverter uses a connection point between the first and second switching devices and a connection point between the third and fourth switching devices as AC terminals of the primary-side inverter. The secondary-side inverter uses a connection point between the fifth and sixth switching devices and a connection point between the seventh and eighth switching devices as AC terminals of the secondary-side inverter. The fault operation decision section is configured to decide the operation of a faulty inverter and the operation of a normal inverter, based on the following Tables 1 and 2.

Operation in Case of Short-Circuit Fault

TABLE 1

| SHORT-CIRCUIT FAULT COMPONENT | INV1 | INV2 |
|---|---|---|
| S1 or S5 | S1: ON | S5: ON |
| | S2: OFF | S6: OFF |
| | S3: SWITCHING (SW) | S7: SW |
| | S4: SW | S8: SW |
| S2 or S6 | S1: OFF | S5: OFF |
| | S2: ON | S6: ON |
| | S3: SW | S7: SW |
| | S4: SW | S8: SW |
| S3 or S7 | S1: SW | S5: SW |
| | S2: SW | S6: SW |
| | S3: ON | S7: ON |
| | S4: OFF | S8: OFF |
| S4 or S8 | S1: SW | S5: SW |
| | S2: SW | S6: SW |
| | S3: OFF | S7: OFF |
| | S4: ON | S8: ON |

Operation in Case of Open-Circuit Fault

TABLE 2

| OPEN-CIRCUIT FAULT COMPONENT | INV1 | INV2 |
|---|---|---|
| S1 or S5 | S1: OFF | S5: OFF |
| | S2: ON | S6: ON |
| | S3: SW | S7: SW |
| | S4: SW | S8: SW |
| S2 or S6 | S1: ON | S5: ON |
| | S2: OFF | S6: OFF |
| | S3: SW | S7: SW |
| | S4: SW | S8: SW |
| S3 or S7 | S1: SW | S5: SW |
| | S2: SW | S6: SW |
| | S3: OFF | S7: OFF |
| | S4: ON | S8: ON |
| S4 or S8 | S1: SW | S5: SW |
| | S2: SW | S6: SW |
| | S3: ON | S7: ON |
| | S4: OFF | S8: OFF |

S1 to S8: first to eighth switching devices
INV1: primary-side inverter
INV2: secondary-side inverter According to still another aspect, the normal operation decision section is configured to derive the phase difference and the selection of full-bridge operation or half-bridge operation for the primary-side inverter and the secondary-side inverter, based on the following Mathematical Expressions (1) to (6).

[Mathematical Expression 1]

$$\theta_{ZVS} > \left(1 - \frac{NV_{out}}{V_{in}}\right)\frac{\pi}{2} \ \text{VOLTAGE CONDITION}(V_{in} \geq NV_{out}) \quad (1)$$

[Mathematical Expression 2]

$$\theta_{ZVS} > \left(1 - \frac{V_{in}}{NV_{out}}\right)\frac{\pi}{2} \ \text{VOLTAGE CONDITION}(V_{in} \leq NV_{out}) \quad (2)$$

[Mathematical Expression 3]

$$\theta_{ZVS} > \left(1 - \frac{NV_{out}}{2V_{in}}\right)\frac{\pi}{2} \ \text{VOLTAGE CONDITION}(2V_{in} \geq NV_{out}) \quad (3)$$

[Mathematical Expression 4]

$$\theta_{ZVS} > \left(1 - \frac{2V_{in}}{NV_{out}}\right)\frac{\pi}{2} \ \text{VOLTAGE CONDITION}(2V_{in} \leq NV_{out}) \quad (4)$$

[Mathematical Expression 5]

$$\theta_{ZVS} > \left(1 - \frac{2NV_{out}}{V_{in}}\right)\frac{\pi}{2} \ \text{VOLTAGE CONDITION}(V_{in} \geq 2NV_{out}) \quad (5)$$

[Mathematical Expression 6]

$$\theta_{ZVS} > \left(1 - \frac{V_{in}}{2NV_{out}}\right)\frac{\pi}{2} \ \text{VOLTAGE CONDITION}(V_{in} \geq 2NV_{out}) \quad (6)$$

In case of Mathematical Expression (1) or (2), primary-side inverter: full-bridge operation, secondary-side inverter: full-bridge operation In case of Mathematical Expression (3) or (4), primary-side inverter: full-bridge operation, secondary-side inverter: half-bridge operation In case of Mathematical Expression (5) or (6), primary-side inverter: half-bridge operation, secondary-side inverter: full-bridge operation θzvs: phase difference N: turns ratio $V_{out}$: secondary-side DC voltage $V_{in}$: primary-side DC voltage According to still another aspect, the gain adjustment section is configured to use values of the gain shown in the following Table 3.

Gain for Respective Operation Modes

TABLE 3

| GAIN | INV1 | INV2 |
|---|---|---|
| 1 | FB OPERATION | FB OPERATION |
| 2 | HB OPERATION | FB OPERATION |
| 2 | FB OPERATION | HB OPERATION |
| 4 | HB OPERATION | HB OPERATION |

FB operation: full-bridge operation

HB operation: half-bridge operation

INV1: primary-side inverter

INV2: secondary-side inverter

The above aspects of the present invention serve to provide a bidirectional isolated DC-DC converter structured to achieve fault-tolerant operation with high efficiency and without additional components.

MODE(S) FOR CARRYING OUT THE INVENTION

The following details first to third embodiments of a bidirectional isolated DC-DC converter according to the present invention, with reference to FIGS. 1 and 3 to 10.

Figure 1:
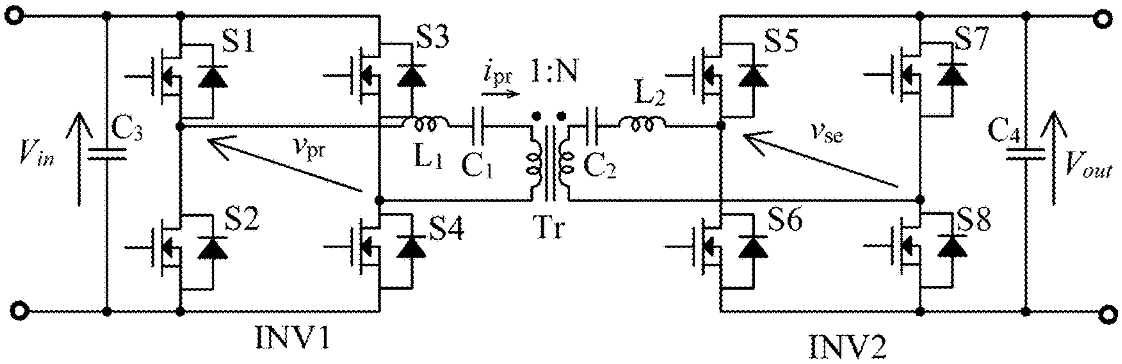
FIG. 1 is a circuit configuration diagram of a bidirectional isolated DCDC converter.
Figure 2:
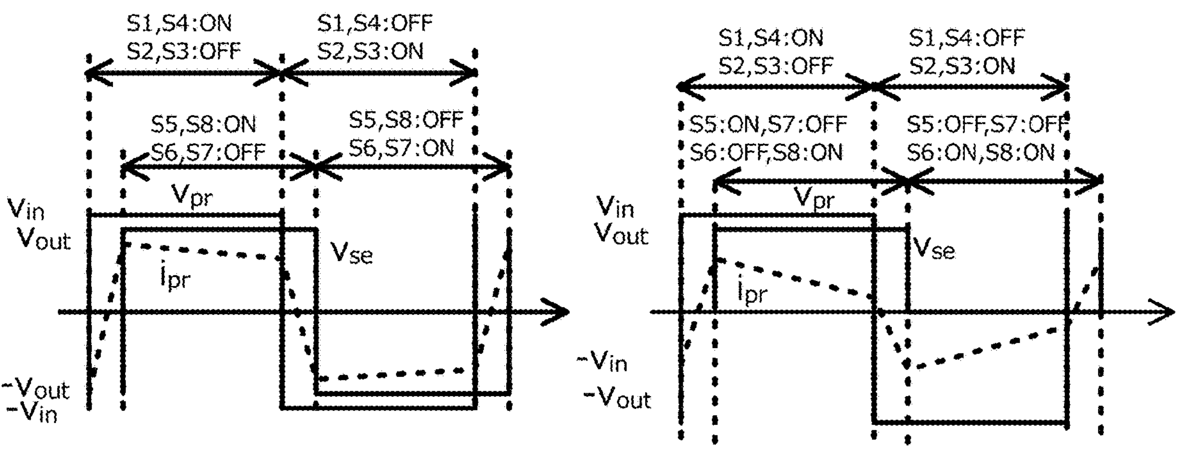
FIG. 2 is an operational waveform diagram of DAB operation.

First, the following describes how a main circuit of the bidirectional isolated DC-DC converter is configured, with reference to FIG. 1.

A first DC power supply C3 (e.g., a capacitor, hereinafter referred to as a first capacitor) includes a positive terminal and a negative terminal between which a first switching device S1 and a second switching device S2 are connected in series. In addition, a third switching device S3 and a fourth switching device S4 are connected in series between the positive and negative terminals of the first capacitor C3. The first to fourth switching devices S1 to S4 compose a primary-side inverter INV1.

A connection point between the first and second switching devices S1 and S2 and a connection point between the third and fourth switching devices S3 and S4 respectively serve as AC terminals of the primary-side inverter INV1. Between these two AC terminals, a first DC-cut capacitor C1 and a primary winding of a transformer Tr are connected. Reference numeral L1 represents a leakage inductance of the transformer Tr.

A second DC power supply C4 (e.g., a capacitor, hereinafter referred to as a second capacitor) includes a positive terminal and a negative terminal between which a fifth switching device S5 and a sixth switching device S6 are connected in series. In addition, a seventh switching device S7 and a eighth switching device S8 are connected in series between the positive and negative terminals of the second capacitor C4. The fifth to eighth switching devices S5 to S8 compose a secondary-side inverter INV2.

A connection point between the fifth and sixth switching devices S5 and S6 and a connection point between the seventh and eighth switching devices S7 and S8 respectively serve as AC terminals of the secondary-side inverter INV2. Between these two AC terminals, a second DC-cut capacitor C2 and a secondary winding of the transformer Tr are connected. Reference numeral L2 represents a leakage inductance of the transformer Tr.

In FIG. 1, reference numeral Vpr represents an output voltage of the primary-side inverter INV1. Reference numeral Vse represents an output voltage of the secondary-side inverter INV2. Reference numeral ipr represents an AC current. The transformer Tr has a turns ratio of (primary winding):(secondary winding)=1:N.

Figure 3:
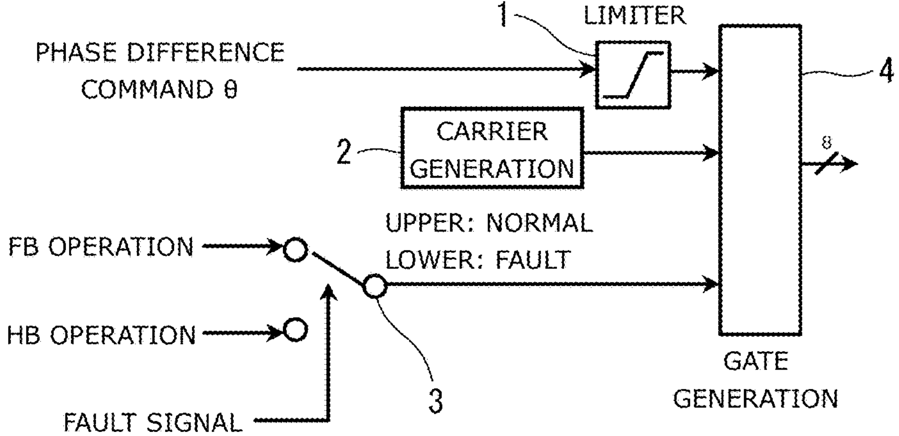
FIG. 3 is a configuration diagram of a control system configured to perform fault-tolerant operation where a method of Non-patent Document 4 is applied for operation upon a fault.

FIG. 3 is a basic configuration diagram of a control system (i.e., a controller) configured to perform fault-tolerant operation in the bidirectional isolated DC-DC converter configured as shown in FIG. 1. In FIG. 3, the circuit operates as a DAB, and switches the primary-side inverter INV1 and the secondary-side inverter INV2 between FB operation and HB operation depending on a fault state, a voltage, and load conditions. FIG. 3 is based on the following configurations.

A phase difference command value θ is a value outputted based on power control, current control, voltage control, and a ratio of a primary-side DC voltage Vin and a secondary-side DC voltage Vout. A calculation method thereof is disclosed in Patent Document 1.

Limiter 1 limits the phase difference command value θ within a range of $-\pi/2$ (lower limit)$\leq\theta\leq\pi/2$ (upper limit). Carrier generation section 2 generates a carrier signal (e.g., a sawtooth wave or a triangular wave) by up and down counting.

Switcher 3 performs switching between FB operation in case of normal conditions and HB operation in case of a short-circuit or open-circuit fault, depending on a fault signal.

Gate signal generation section 4 generates gate signals to operate the primary-side inverter INV1 and the secondary-side inverter INV2 in FB mode, in case that both of the primary-side inverter INV1 and the secondary-side inverter INV2 are normal. In case that at least one of the primary-side inverter INV1 or the secondary-side inverter INV2 has a short-circuit fault or an open-circuit fault, the gate signal generation section 4 generates gate signals to operate the faulty inverter in HB mode and operate the normal inverter in FB mode. For both of FB operation and HB operation, the gate signal generation section 4 compares the phase difference command value θ with the carrier signal, and generates gate signals each with a duty ratio of 50% and a desired phase.

Figure 4:
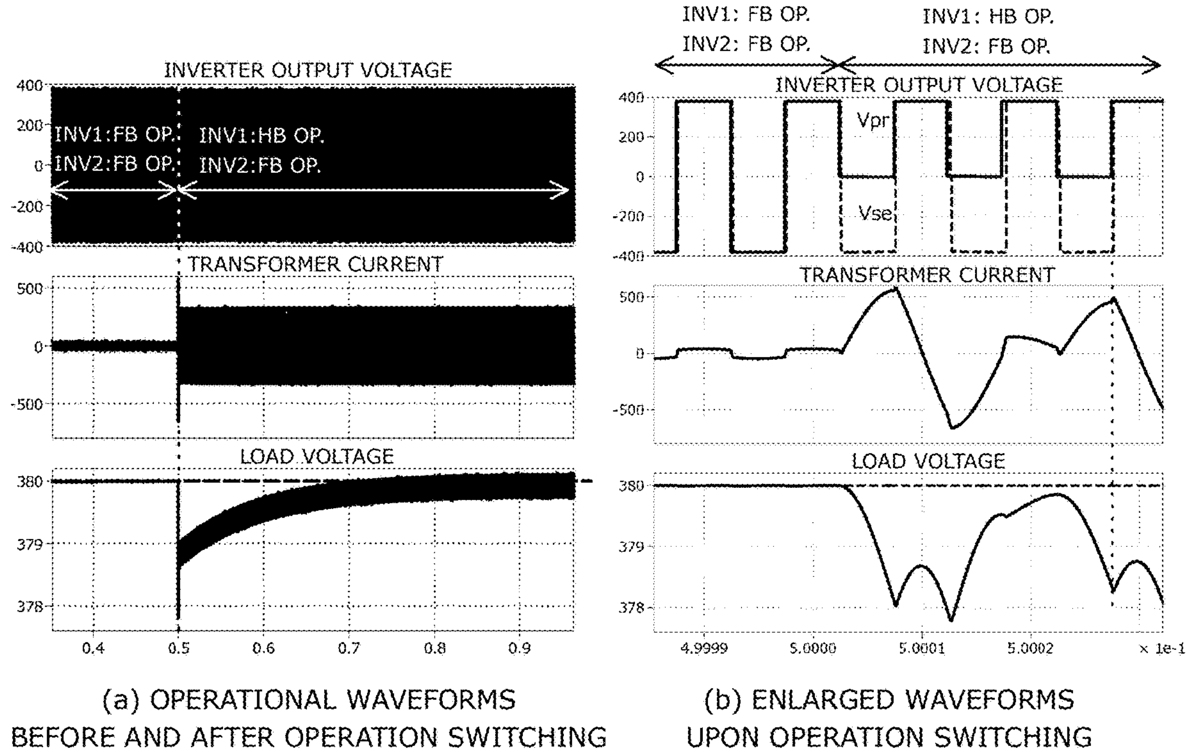
FIG. 4 is an operational waveform diagram (when applying a load voltage control) of the control system in FIG. 3.

FIG. 3 shows a method for applying the operation of Non-patent Document 4 to a case of a component fault. FIG. 4(*a*) shows operational waveforms before and after operation switching. FIG. 4(*b*) shows enlarged waveforms upon the operation switching. The method of FIG. 3 is configured to change operation of only the faulty inverter, and accordingly, as shown in FIG. 4, simulates a short-circuit fault of the primary-side inverter INV1 and switches the primary-side inverter INV1 to HB operation.

As shown in FIG. 4, the operation switching causes an increase in difference between the output voltage Vpr of the primary-side inverter INV1 and the output voltage Vse of the secondary-side inverter INV2 and an increase in voltage applied to the leakage inductances L1 and L2 of the transformer Tr, and consequently causes an increase in steady-state value of transformer current and occurrence of an excessive current.

FIRST EMBODIMENT

Figure 5:
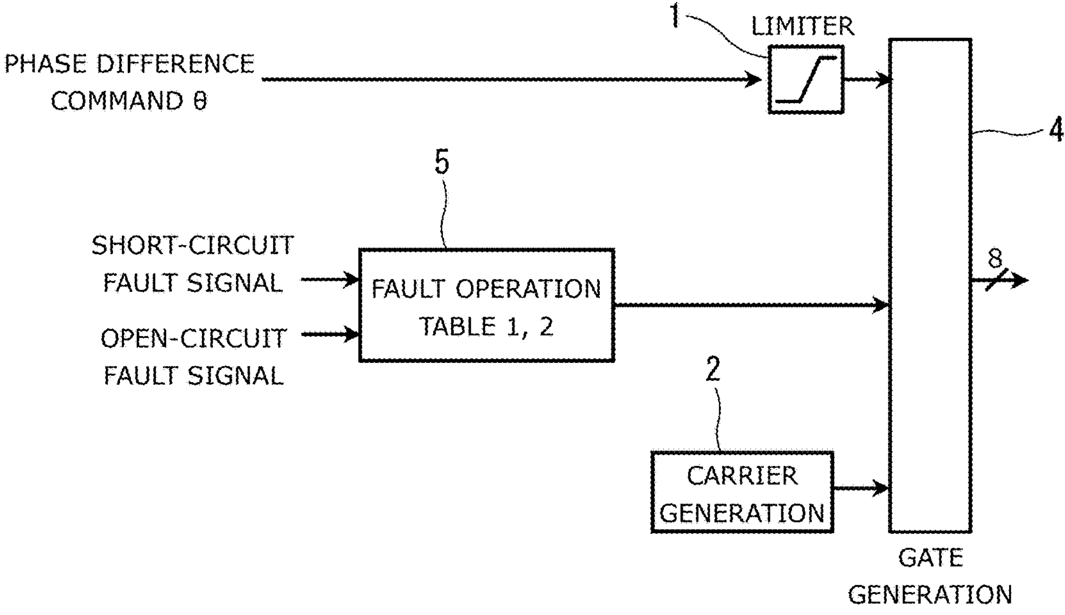
FIG. 5 is a configuration diagram of a control system according to a first embodiment.

FIG. 5 shows a configuration diagram of a control system (i.e., a controller) according to the first embodiment. The first embodiment is configured to change not only operation of a faulty inverter but also operation of a normal inverter. The following omits explanations of parts same with FIG. 3, and explains only parts different from FIG. 3.

Fault operation decision section 5 receives a fault signal (i.e., a short-circuit fault signal or an open-circuit fault signal). In case that at least one of the primary-side inverter INV1 and the secondary-side inverter INV2 has a short-circuit fault or an open-circuit fault, the fault operation decision section 5 decides operation of the faulty inverter and operation of the normal inverter so as to reduce a difference between the output voltage Vpr of the primary-side inverter INV1 and the output voltage Vse of the secondary-side inverter INV2. The "operation" refers to "ON", "OFF" or "SW (switching)" of respective switching devices, which is decided by selecting from among "ON", "OFF", and "SW".

In case that at least one of the primary-side inverter INV1 and the secondary-side inverter INV2 has a short-circuit fault or an open-circuit fault, the fault operation decision section 5 operates both of the faulty inverter and the normal inverter in HB mode.

In case that both of the primary-side inverter INV1 and the secondary-side inverter INV2 are normal, the gate signal generation section 4 compares the phase difference command value θ with the carrier signal, and generates gate signals each with a duty ratio of 50% and a desired phase. In general, under normal conditions, the gate signals are generated so as to operate the primary-side inverter INV1 and the secondary-side inverter INV2 in FB mode.

In case that at least one of the primary-side inverter INV1 and the secondary-side inverter INV2 has a short-circuit fault or an open-circuit fault, the gate signal generation section 4 generates gate signals for the switching devices, based on the operation of the faulty inverter and the operation of the normal inverter that have been decided by the fault operation decision section 5. In the case of a short-circuit fault or an open-circuit fault, both of the faulty inverter and the normal inverter are operated in HB mode. Also in case of HB operation, the gate signal generation section 4 compares the phase difference command value θ with the carrier signal, and generates gate signals each with a duty ratio of 50% and a desired phase.

The first embodiment serves to achieve high-efficiency fault tolerant operation by changing operation of the primary-side inverter INV1 and the secondary-side inverter INV2 so as to suppress increase in voltage applied to the leakage inductances L1 and L2 of the transformer Tr upon operation switching, depending on a fault state of the switching devices.

The present embodiment is configured to operate the system of FIG. 1 as a DAB and control the phase difference command value θ for the output voltage Vpr of the primary-side inverter INV1 and the output voltage Vse of the secondary-side inverter INV2 that are outputted based on power control, voltage control, or current control.

In case of a fault, operation of both the faulty inverter and the normal inverter are changed in accordance with faulty components shown in Tables 1 and 2, so as to suppress the voltages applied to the leakage inductances L1 and L2 of the transformer Tr.

Figure 6:
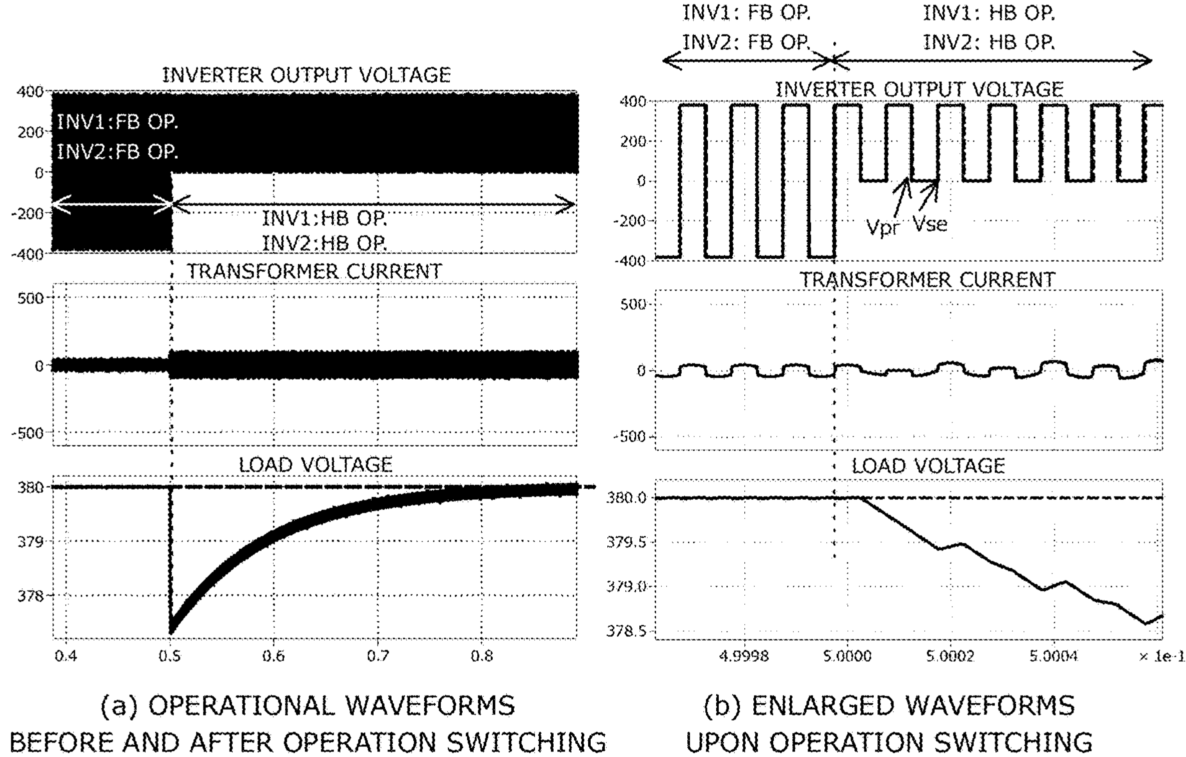
FIG. 6 is a diagram of operational waveforms (when applying a load voltage control) according to the first embodiment.

FIG. 6 shows operational waveforms in case of applying the first embodiment. This is based on assumption that a switching device in the primary-side inverter INV1 has a short-circuit fault, and shows switching to operation corresponding to operation shown in Table 1. In comparison with FIG. 4, FIG. 6 shows reducing a transformer current in a transient state and a steady state by matching directions of the output voltage Vpr of the primary-side inverter INV1 and the output voltage Vse of the secondary-side inverter INV2.

Operation in Case of Short-circuit Fault

TABLE 1

| SHORT-CIRCUIT FAULT COMPONENT | INV1 | INV2 |
|---|---|---|
| S1 or S5 | S1: ON | S5: ON |
| | S2: OFF | S6: OFF |
| | S3: SWITCHING (SW) | S7: SW |
| | S4: SW | S8: SW |
| S2 or S6 | S1: OFF | S5: OFF |
| | S2: ON | S6: ON |
| | S3: SW | S7: SW |
| | S4: SW | S8: SW |
| S3 or S7 | S1: SW | S5: SW |
| | S2: SW | S6: SW |
| | S3: ON | S7: ON |
| | S4: OFF | S8: OFF |
| S4 or S8 | S1: SW | S5: SW |
| | S2: SW | S6: SW |
| | S3: OFF | S7: OFF |
| | S4: ON | S8: ON |

Operation in Case of Open-circuit Fault

TABLE 2

| OPEN-CIRCUIT FAULT COMPONENT | INV1 | INV2 |
|---|---|---|
| S1 or S5 | S1: OFF | S5: OFF |
| | S2: ON | S6: ON |
| | S3: SW | S7: SW |
| | S4: SW | S8: SW |
| S2 or S6 | S1: ON | S5: ON |
| | S2: OFF | S6: OFF |
| | S3: SW | S7: SW |
| | S4: SW | S8: SW |
| S3 or S7 | S1: SW | S5: SW |
| | S2: SW | S6: SW |
| | S3: OFF | S7: OFF |
| | S4: ON | S8: ON |
| S4 or S8 | S1: SW | S5: SW |
| | S2: SW | S6: SW |
| | S3: ON | S7: ON |
| | S4: OFF | S8: OFF |

As described above, the first embodiments serves to suppress a transformer current in a transient state upon operation switching and a transformer current in a steady state after the operation switching, and thereby achieve high efficiency in operation upon a component fault.

SECOND EMBODIMENT

Figure 7:
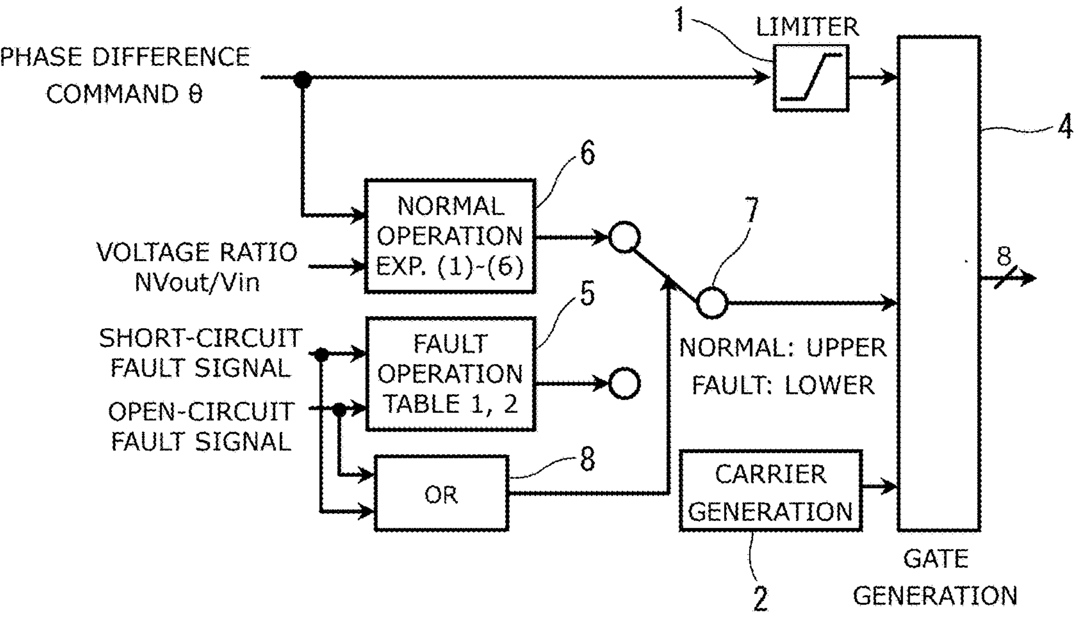
FIG. 7 is a configuration diagram of a control system according to a second embodiment.

FIG. 7 shows a configuration diagram of a control system (i.e., a controller) according to the second embodiment. The second embodiment is configured to perform operation for high efficiency under normal conditions. The following omits explanations of parts same with FIG. 5, and explains only parts different from FIG. 5.

Normal operation decision section 6 receives the phase difference command value θ and a DC voltage ratio NVout/Vin, and outputs: a phase difference that achieves soft switching under a voltage condition between the primary-side DC voltage Vin and the secondary-side DC voltage Vout; and selection of FB or HB operation for the primary-side inverter INV1 and the secondary-side inverter INV2. The voltage ratio is a ratio of a value of the primary-side DC voltage Vin and a value obtained by multiplying the secondary-side DC voltage Vout by the turns ratio N.

Logical OR section 8 receives a short-circuit fault signal and an open-circuit fault signal, and outputs 1 in case of a fault (i.e., a short-circuit fault or an open-circuit fault) and outputs 0 otherwise. Switcher 7 outputs the output of the normal operation decision section 6 under normal conditions (i.e., in case that the logical OR section 8 outputs 0), and outputs the output of the fault operation decision section 5 in case of a fault (i.e., in case that the logical OR section 8 outputs 1).

The second embodiment is characterised by improved efficiency under normal conditions, and is configured to perform operation that enables soft switching under normal conditions. The following Mathematical Expressions (1) to (6) show how to calculate a phase difference $\theta_{zvs}$ between the output voltage Vpr and the output voltage Vse that enables selection of FB or HB operation for the primary-side inverter INV1 and the secondary-side inverter INV2, and soft switching based on a magnitude relationship (i.e., the voltage condition) between the primary-side DC voltage Vin and the secondary-side DC voltage Vout.

INV1: FB Operation, INV2: FB Operation

[Mathematical Expression 1]

$$\theta_{ZVS} > \left(1 - \frac{NV_{out}}{V_{in}}\right)\frac{\pi}{2} \quad \text{VOLTAGE CONDITION}(V_{in} \geq NV_{out}) \tag{1}$$

[Mathematical Expression 2]

$$\theta_{ZVS} > \left(1 - \frac{V_{in}}{NV_{out}}\right)\frac{\pi}{2} \quad \text{VOLTAGE CONDITION}(V_{in} \leq NV_{out}) \tag{2}$$

INV1: FB Operation, INV2: HB Operation

[Mathematical Expression 3]

$$\theta_{ZVS} > \left(1 - \frac{NV_{out}}{2V_{in}}\right)\frac{\pi}{2} \quad \text{VOLTAGE CONDITION}(2V_{in} \geq NV_{out}) \tag{3}$$

[Mathematical Expression 4]

$$\theta_{ZVS} > \left(1 - \frac{2V_{in}}{NV_{out}}\right)\frac{\pi}{2} \quad \text{VOLTAGE CONDITION}(2V_{in} \leq NV_{out}) \tag{4}$$

INV1: HB Operation, INV2: FB Operation

[Mathematical Expression 5]

$$\theta_{ZVS} > \left(1 - \frac{2NV_{out}}{V_{in}}\right)\frac{\pi}{2} \quad \text{VOLTAGE CONDITION}(V_{in} \geq 2NV_{out}) \tag{5}$$

[Mathematical Expression 6]

$$\theta_{ZVS} > \left(1 - \frac{V_{in}}{2NV_{out}}\right)\frac{\pi}{2} \quad \text{VOLTAGE CONDITION}(V_{in} \geq 2NV_{out}) \tag{6}$$

In the second embodiment, the gate signal generation section 4 compares the phase difference command value θ, which is outputted by limiter 1 as shown in FIG. 7, with phase differences $\theta_{zvs}$ satisfying soft switching conditions represented by Mathematical Expressions (1) to (6), and corrects the phase difference command value θ to the phase difference $\theta_{zvs}$ that is closest to the phase difference command value θ among the phase differences $\theta_{zvs}$ calculated with use of Mathematical Expressions (1) to (6) satisfying the voltage condition.

In case that the phase difference command value θ is closest to the phase difference $\theta_{zvs}$ of Mathematical Expression (1) or (2) among Mathematical Expressions (1) to (6) satisfying the voltage condition, the primary-side inverter INV1 is set to FB operation, and the secondary-side inverter INV2 is set to FB operation. In case that the phase difference command value θ is closest to the phase difference $\theta_{zvs}$ of Mathematical Expression (3) or (4), the primary-side inverter INV1 is set to FB operation, and the secondary-side inverter INV2 is set to HB operation. In case that the phase difference command value θ is closest to the phase difference $\theta_{zvs}$ of Mathematical Expression (5) or (6), the primary-side inverter INV1 is set to HB operation, and the secondary-side inverter INV2 is set to FB operation.

This extends a soft-switching range with respect to change in the primary-side DC voltage Vin and the secondary-side DC voltage Vout, and besides reduces a reactive component of transformer current as shown in Non-patent Document 4.

In case of being unable to achieve Zero Voltage Switching (ZVS) for all operations, the present embodiment is configured to compare a present value of the phase difference command value θ with the phase differences $\theta_{zvs}$ between the output voltages Vpr and Vse enabling soft switching of respective operations, and selects one of the operations in which the phase difference command value θ is closest to the phase difference $\theta_{zvs}$.

In case that both of the primary-side inverter INV1 and the secondary-side inverter INV2 are normal, the gate signal generation section 4 generates gate signals based on: comparison of the carrier signal with the phase difference $\theta_{zvs}$ closest to the phase difference command value θ among the phase differences $\theta_{zvs}$ of Mathematic Expressions (1) to (6) satisfying the voltage condition; and selection of FB or HB operation for the primary-side inverter INV1 and the secondary-side inverter INV2 which is determined by the normal operation decision section 6.

The second embodiment is same with the first embodiment in operation under abnormal conditions. However, the gate signals are generated with correction of the phase difference command value θ to the phase difference $\theta_{zvs}$ in case of "SW" in Tables 1 and 2.

Figure 8:
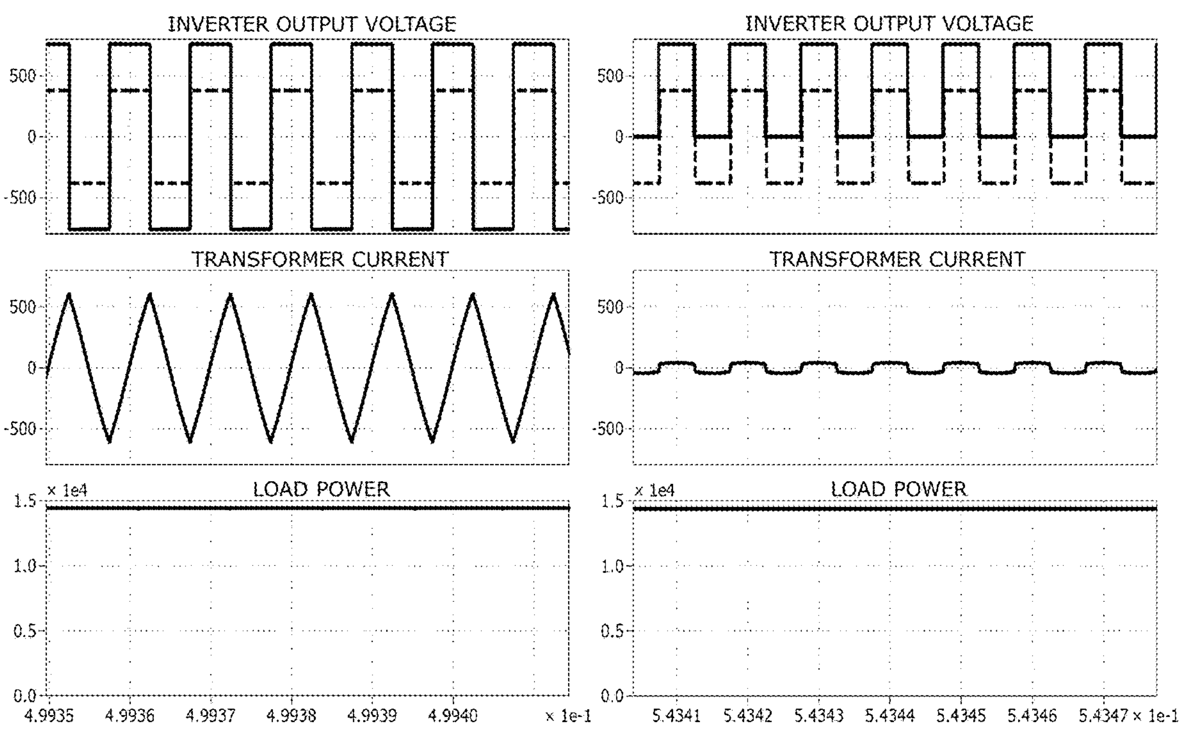
FIG. 8 is a diagram of operational waveforms (when applying a voltage control) according to the first and second embodiments.

FIG. 8 shows operational waveforms when applying the first embodiment and the second embodiment: Vin=760 V, Vout=380 V, N=1, voltage control applied. As shown in FIG. 8, the configuration of switching operation also under normal conditions on the basis of the DC voltage ratio NVout/Vin and the phase difference command value θ reduces transformer current even under the same load power.

Thus, the second embodiment is configured to switch operation also under normal conditions on the basis of the DC voltage ratio and the phase difference command value. This serves to extend the soft-switching range even under a condition of a large difference in DC voltage, and thereby achieve high efficiency.

THIRD EMBODIMENT

Figure 9:
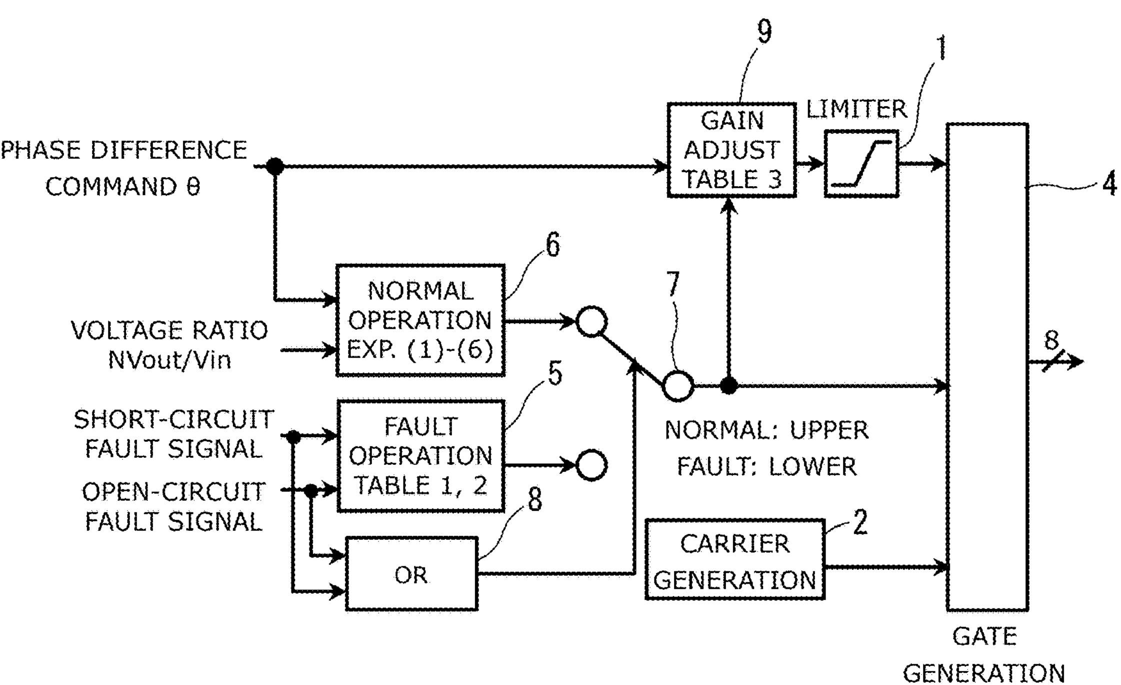
FIG. 9 is a configuration diagram of a control system according to a third embodiment.

FIG. 9 shows a configuration diagram of a control system (i.e., a controller) in the third embodiment. The third embodiment is configured to adjust a gain so as to match a load current before and after operation switching. The following omits explanations of parts same with FIG. 7, and explains only parts different from FIG. 7.

Gain adjustment section 9 multiplies the phase difference command value θ by the gain in accordance with selection of FB or HB operation for the primary-side inverter INV1 and the secondary-side inverter INV2, and outputs the phase difference command value θ after the gain multiplication to limiter 1.

The gain adjustment according to the third embodiment is performed by multiplying the phase difference command value θ by the gain shown in Table 3. This prevents the load current from changing upon operation switching, and suppresses deterioration in responsiveness to voltage control or current control due to operation switching.

The phase difference command value θ is multiplied by one of the applicable gain values (i.e., one of 1, 2, and 4) shown in Table 3, when the primary-side inverter INV1 and the secondary-side inverter INV2 are respectively in FB operation or HB operation shown in Table 3. This phase difference command value θ having been multiplied by the gain value is inputted to limiter 1 as shown in FIG. 9. Determination of FB operation/HB operation is performed based on the phase difference command value θ.

Figure 10:
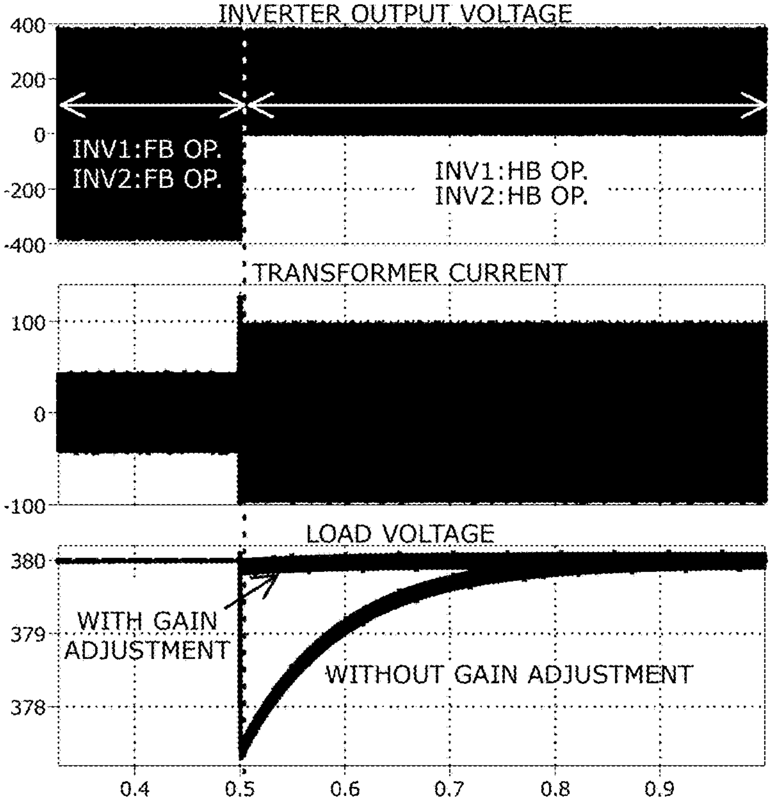
FIG. 10 is a diagram of operational waveforms (before and after applying a gain adjustment) according to the third embodiment.

FIG. 10 shows operational waveforms with and without application of the third embodiment. The case of FIG. 10 applies voltage control to a load side, and measures fluctuation in load voltage by operation switching. As shown in FIG. 10, the gain adjustment according to the third embodiment suppresses fluctuation in DC voltage caused by operation switching.

Gains for Respective Operations

TABLE 3

| GAIN | INV1 | INV2 |
|---|---|---|
| 1 | FB OPERATION | FB OPERATION |
| 2 | HB OPERATION | FB OPERATION |
| 2 | FB OPERATION | HB OPERATION |
| 4 | HB OPERATION | HB OPERATION |

The third embodiment maintains the load current constant before and after operation switching, and accordingly suppresses deterioration in responsiveness to voltage control or current control due to operation switching. This eliminates necessity for redesigning control gains when applying an operation switching method.

The above description details only the specific examples of how to apply the present invention. However, as is obvious to a person skilled in the art, those may be variously modified or altered within scope of technical concepts of the present invention. Naturally, also such modification and alteration belong to scope of the present claims.

The invention claimed is:

1. A bidirectional isolated DC-DC converter comprising:

a primary-side inverter;

a first DC cut capacitor connected to an AC side of the primary-side inverter;

a secondary-side inverter;

a second DC cut capacitor connected to an AC side of the secondary-side inverter;

a transformer including a primary winding connected to the AC side of the primary-side inverter and a secondary winging connected to the AC side of the secondary-side inverter; and a controller configured to control switching devices of the primary-side inverter and the secondary-side inverter, wherein the controller is configured to decide operation of the primary-side inverter and operation of the secondary-side inverter depending on a fault state of the switching devices of the primary-side inverter and the secondary-side inverter, so as to reduce increase in voltage applied to a leakage inductance of the transformer.

2. The bidirectional isolated DC-DC converter as claimed in claim 1, wherein the controller includes: a limiter configured to limit a phase difference command value to a value equal to or greater than a lower limit and equal to or less than an upper limit, and output the phase difference command value; a carrier generation section configured to output a carrier signal; a fault operation decision section configured to decide operation of a faulty inverter and operation of a normal inverter depending on a short-circuit fault signal or an open-circuit fault signal, so as to reduce a difference between the primary-side inverter and the secondary-side inverter in output voltage; and a gate signal generation section configured to generate gate signals for the switching devices, based on: the carrier signal and the phase difference command value outputted from the limiter, in case that both of the primary-side inverter and the secondary-side inverter are normal; and the carrier signal, the phase difference command value outputted from the limiter, and the operation of the faulty inverter and the operation of the normal inverter decided by the fault operation decision section, in case that at least one of the primary-side inverter and the secondary-side inverter is faulty.

3. The bidirectional isolated DC-DC converter as claimed in claim 2, wherein:

the controller includes a normal operation decision section configured to output an output A and an output B based on the phase difference command value and a ratio of a primary-side DC voltage to a secondary-side DC voltage, wherein: the output A is a phase difference in output voltage between the primary-side inverter and the secondary-side inverter which achieves soft switching under a voltage condition between the primary-side DC voltage and the secondary-side DC voltage; and the output B is selection of full-bridge operation or half-bridge operation for the primary-side inverter and the secondary-side inverter; and the gate signal generation section is configured to generate the gate signals based on a basis X and a basis Y in case that both of the primary-side inverter and the secondary-side inverter are normal, wherein: the basis X is comparison of the carrier signal with the phase difference that is closest to the phase difference command value among the phase differences satisfying the voltage condition; and the basis Y is the selection of full-bridge operation or half-bridge operation for the primary-side inverter and the secondary-side inverter which is outputted from the normal operation decision section.

4. The bidirectional isolated DC-DC converter as claimed in claim 3, wherein the controller includes a gain adjustment section configured to multiply the phase difference command value by a gain based on the selection of full-bridge operation or half-bridge operation for the primary-side inverter and the secondary-side inverter, and output the phase difference command value after the gain multiplication to the limiter.

5. The bidirectional isolated DC-DC converter as claimed in claim 4, wherein the gain adjustment section is configured to use values of the gain shown in the following Table 3;

Gain for Respective Operation Modes

TABLE 3

| GAIN | INV1 | INV2 |
|---|---|---|
| 1 | FB OPERATION | FB OPERATION |
| 2 | HB OPERATION | FB OPERATION |
| 2 | FB OPERATION | HB OPERATION |
| 4 | HB OPERATION | HB OPERATION |

FB operation: full-bridge operation
HB operation: half-bridge operation
INV1: the primary-side inverter
INV2: secondary-side inverter.

6. The bidirectional isolated DC-DC converter as claimed in claim 3, wherein the normal operation decision section is configured to derive the phase difference and the selection of full-bridge operation or half-bridge operation for the primary-side inverter and the secondary-side inverter, based on the following Mathematical Expressions (1) to (6)

[Mathematical Expression 1]

$$\theta_{ZVS} > \left(1 - \frac{NV_{out}}{V_{in}}\right)\frac{\pi}{2} \underset{CONDITION}{VOLTAGE}(V_{in} \geq NV_{out}) \quad (1)$$

[Mathematical Expression 2]

$$\theta_{ZVS} > \left(1 - \frac{V_{in}}{NV_{out}}\right)\frac{\pi}{2} \underset{CONDITION}{VOLTAGE}(V_{in} \leq NV_{out}) \quad (2)$$

[Mathematical Expression 3]

$$\theta_{ZVS} > \left(1 - \frac{NV_{out}}{2V_{in}}\right)\frac{\pi}{2} \underset{CONDITION}{VOLTAGE}(2V_{in} \geq NV_{out}) \quad (3)$$

[Mathematical Expression 4]

$$\theta_{ZVS} > \left(1 - \frac{2V_{in}}{NV_{out}}\right)\frac{\pi}{2} \underset{CONDITION}{VOLTAGE}(2V_{in} \leq NV_{out}) \quad (4)$$

[Mathematical Expression 5]

$$\theta_{ZVS} > \left(1 - \frac{2NV_{out}}{V_{in}}\right)\frac{\pi}{2} \underset{CONDITION}{VOLTAGE}(V_{in} \geq 2NV_{out}) \quad (5)$$

[Mathematical Expression 6]

$$\theta_{ZVS} > \left(1 - \frac{V_{in}}{2NV_{out}}\right)\frac{\pi}{2} \underset{CONDITION}{VOLTAGE}(V_{in} \geq 2NV_{out}) \quad (6)$$

In case of Mathematical Expression (1) or (2), the primary-side inverter: full-bridge operation, the secondary-side inverter: full-bridge operation, secondary-side inverter: full-bridge operation In case of Mathematical Expression (3) or (4), the primary-side inverter: full-bridge operation, the secondary-side inverter: half-bridge operation In case of Mathematical Expression (5) or (6), the primary-side inverter: half-bridge operation, the secondary-side inverter: full-bridge operation θ.sub.zvs: phase difference N: turns ratio V.sub.out: the secondary-side DC voltage V.sub.in: the primary-side DC voltage.

7. The bidirectional isolated DC-DC converter as claimed in claim 2, wherein: the switching devices of the primary-side inverter include first and second switching devices connected between a positive terminal and a negative terminal of a primary-side DC power supply and third and fourth switching devices connected between the positive terminal and the negative terminal of the primary-side DC power supply; the switching devices of the secondary-side inverter include fifth and sixth switching devices connected between a positive terminal and a negative terminal of a secondary-side DC power supply and seventh and eighth switching devices connected between the positive terminal and the negative terminal of the secondary-side DC power supply; the primary-side inverter uses a connection point between the first and second switching devices and a connection point between the third and fourth switching devices as AC terminals of the primary-side inverter; the secondary-side inverter uses a connection point between the fifth and sixth switching devices and a connection point between the seventh and eighth switching devices as AC terminals of the secondary-side inverter; and the fault operation decision section is configured to decide the operation of the faulty inverter and the operation of the normal inverter, based on the following Tables 1 and 2;

Operation in Case of Short-circuit Fault

TABLE 1

| SHORT-CIRCUIT FAULT COMPONENT | INV1 | INV2 |
|---|---|---|
| S1 or S5 | S1: ON | S5: ON |
| | S2: OFF | S6: OFF |
| | S3: SWITCHING (SW) | S7: SW |
| | S4: SW | S8: SW |
| S2 or S6 | S1: OFF | S5: OFF |
| | S2: ON | S6: ON |
| | S3: SW | S7: SW |
| | S4: SW | S8: SW |
| S3 or S7 | S1: SW | S5: SW |
| | S2: SW | S6: SW |
| | S3: ON | S7: ON |
| | S4: OFF | S8: OFF |
| S4 or S8 | S1: SW | S5: SW |
| | S2: SW | S6: SW |
| | S3: OFF | S7: OFF |
| | S4: ON | S8: ON |

Operation in Case of open-Circuit Fault

TABLE 2

| OPEN-CIRCUIT FAULT COMPONENT | INV1 | INV2 |
|---|---|---|
| S1 or S5 | S1:OFF | S5:OFF |
| | S2:ON | S6:ON |
| | S3:SW | S7:SW |
| | S4:SW | S8:SW |
| S2 or S6 | S1:ON | S5:ON |
| | S2:OFF | S6:OFF |
| | S3:SW | S7:SW |
| | S4:5W | S8:SW |
| S3 or S7 | S1:SW | S5:SW |
| | S2:SW | S6:SW |
| | S3:OFF | S7:OFF |
| | S4:ON | S8:ON |
| S4 or S8 | S1:SW | S5:SW |
| | S2:SW | S6:SW |
| | S3:ON | S7:ON |
| | S4:OFF | S8:OFF |

S1 to S8: first to eighth switching devices
INV1: primary-side inverter
INV2: secondary-side inverter.

* * * * *